(12) United States Patent
Kim

(10) Patent No.: US 12,502,209 B2
(45) Date of Patent: Dec. 23, 2025

(54) SPINE FIXING DEVICE

(71) Applicants: KYUNGPOOK NATIONAL UNIVERSITY INDUSTRY-ACADEMIC COOPERATION FOUNDATION, Daegu (KR); INSPINE Co., Ltd., Daegu (KR)

(72) Inventor: Kyoung-Tae Kim, Daegu (KR)

(73) Assignees: KYUNGPOOK NATIONAL UNIVERSITY INDUSTRY-ACADEMIC COOPERATION FOUNDATION, Daegu (KR); INSPINE Co., Ltd., Daegu (KR)

( * ) Notice: Subject to any disclaimer, the term of this patent is extended or adjusted under 35 U.S.C. 154(b) by 194 days.

(21) Appl. No.: 18/279,050

(22) PCT Filed: Jan. 11, 2022

(86) PCT No.: PCT/KR2022/000407
§ 371 (c)(1),
(2) Date: Aug. 25, 2023

(87) PCT Pub. No.: WO2022/181977
PCT Pub. Date: Sep. 1, 2022

(65) Prior Publication Data
US 2024/0293157 A1   Sep. 5, 2024

(30) Foreign Application Priority Data

Feb. 26, 2021  (KR) .......................... 10-2021-0026646
Jun. 4, 2021   (KR) .......................... 10-2021-0072521

(51) Int. Cl.
*A61B 17/70*   (2006.01)

(52) U.S. Cl.
CPC ............................... *A61B 17/7059* (2013.01)

(58) Field of Classification Search
CPC .................................................. A61F 2/44–447
See application file for complete search history.

(56) References Cited

U.S. PATENT DOCUMENTS

| 8,066,749 B2 | 11/2011 | Winslow et al. |
| 8,357,200 B2 | 1/2013 | Adl |
| 9,339,390 B2 | 5/2016 | Fortin et al. |
| 2004/0015169 A1* | 1/2004 | Gause ............... A61B 17/8042 606/63 |
| 2006/0276897 A1 | 12/2006 | Winslow et al. |
| 2009/0326589 A1 | 12/2009 | Lemoine et al. |

(Continued)

FOREIGN PATENT DOCUMENTS

| EP | 2793758 B1 | 11/2017 |
| KR | 10-1297982 B1 | 8/2013 |

(Continued)

*Primary Examiner* — Nicholas J Plionis
(74) *Attorney, Agent, or Firm* — Bridgeway IP Law Group, PLLC; Sang Ho Lee; Hyun Woo Shin

(57) ABSTRACT

Provided is a spine fixing device including: a base plate; a cage configured to be coupled to the base plate; a first wing plate configured to be coupled to an upper portion of a composite body of the base plate and the cage; and a second wing plate configured to be coupled to a lower portion of the composite body of the base plate and the cage.

10 Claims, 16 Drawing Sheets

(56) References Cited

U.S. PATENT DOCUMENTS

| | | | |
|---|---|---|---|
| 2011/0224793 A1* | 9/2011 | Fortin | A61F 2/44 623/17.11 |
| 2011/0230971 A1* | 9/2011 | Donner | A61B 17/846 606/246 |
| 2014/0200670 A1 | 7/2014 | Chin et al. | |
| 2018/0235671 A1 | 8/2018 | Jackson, III | |
| 2020/0179129 A1* | 6/2020 | Lauf | A61F 2/30749 |
| 2022/0061901 A1* | 3/2022 | Linder | A61B 17/8004 |

FOREIGN PATENT DOCUMENTS

| | | |
|---|---|---|
| KR | 10-2020-0132214 A | 11/2020 |
| KR | 10-2020-0139065 A | 12/2020 |
| WO | 02/080791 A1 | 10/2002 |
| WO | 2021/206818 A1 | 10/2021 |

\* cited by examiner

SPINE FIXING DEVICE

TECHNICAL FIELD

The present disclosure relates to a spine fixing device, and more particularly, to a spine fixing device for supporting and fixing the spine from which a disk is removed during spine surgery performed on the cervical spine, the thoracic spine, the lumbar spine, and the like.

BACKGROUND ART

Generally, in recent years, there have been numerous cases of spinal diseases including degenerative deformity, congenital deformity, traumatic deformity, or the like in the structure of the spinal bone, such as spinal stenosis caused by a reduction in the space between vertebral bodies or spondylolisthesis or retrolisthesis in which the arrangement between vertebral bodies is distorted, and various kinds of treatment have been performed for such cases.

The lumbar spine is also referred to as the lower back and normally consists of five vertebrae, and the thoracic spine adjacent to the lumbar spine consists of twelve vertebrae. Normally, a disk is present in a space between one vertebral body and another vertebral body.

However, due to congenital deformity, degenerative deformity, or various other reasons such as accidents, a structural problem in the spine, such as a problem in the stable arrangement of vertebral bodies of the spine or a reduction in space between vertebral bodies, may occur, and when such symptoms become severe, surgical treatment is necessary.

Here, one method that may be used for spinal fusion is intervertebral cage insertion in which, generally, while a patient is lying prone, the skin and muscles are cut to expose spinal bone, an intervertebral disk, which is a structure between vertebral bodies, is removed, and then a cage is inserted between the spinal cord and a nerve root.

The cage is a device inserted in place of the original intervertebral disk after an intervertebral disk with a lesion is removed from between one vertebral body and another vertebral body. The conventional cages have problems that, since heights of a front side and a rear side of a cage are constant, a risk of detachment of the cage after treatment is high, and when the height of the front side is made high to correspond to the normal curvature of the spine, a risk of damage to adjacent nerves during insertion of the cage is high.

Also, the conventional cages have a problem that plate stability is reduced due to the absence of a device for preventing a screw inserted into a spinal bone from being detached from a plate.

RELATED ART DOCUMENT

Patent Document (Patent Document 1) Korean Patent Registration No. 10-1297982

DISCLOSURE

Technical Problem

The present disclosure is directed to providing a spine fixing device that can be flexibly fixed according to the shape of the spine and can prevent movement of a screw coupled to the spine to allow a plate to be firmly coupled.

Technical Solution

One embodiment of the present disclosure provides a spine fixing device including: a base plate; a cage configured to be coupled to the base plate; a first wing plate configured to be coupled to an upper portion of a composite body of the base plate and the cage; and a second wing plate configured to be coupled to a lower portion of the composite body of the base plate and the cage.

Here, the first and second wing plates may be formed to be rotatable along a guide groove of the base plate while at positions where the first and second wing plates are coupled to the composite body of the base plate and the cage.

Also, the first and second wing plates may each be coupled to the base plate through a coupling pin including a spherical or capsular coupling end.

Also, the coupling pin may have a length that allows each wing plate to be spaced apart from the composite body of the base plate and the cage in a height direction.

Also, the coupling end of each of the first and second wing plates may be disposed between the base plate and the cage, the base plate and the cage may be coupled by a tightening screw passing through the base plate and then being inserted into the cage and coupled, and while the tightening screw couples the base plate and the cage, each of the base plate and the cage may come in close contact with one of the coupling end of the first wing plate and the coupling end of the second wing plate so that the first and second wing plates are fixed to the composite body of the base plate and the cage.

Also, the coupling end of each of the first and second wing plates may be formed so that a fixing strength thereof is adjusted by a degree to which the tightening screw is tightened.

Also, a semispherical coupler may protrude from one of the base plate and the cage, and a semispherical insertion groove, into which the coupler is inserted, may be formed in the other one of the base plate and the cage so that, while the base plate and the cage are coupled, the coupler is configured to be inserted into the insertion groove, and the tightening screw is configured to pass through the coupler and couple the base plate and the cage.

Also, the spine fixing device may further include a cover configured to be coupled to each of the first and second wing plates, configured to be coupled at a position opposite to the cage with respect to the base plate, and configured to be rotatable with respect to a shaft coupled to each of the wing plates.

Here, the cover may have protruding pieces formed to correspond to the number of a plurality of screw holes, and the protruding pieces may be formed to simultaneously cover the plurality of screw holes at an arbitrary angle.

Also, the cover may be formed to have a pressing force in a direction toward each wing plate due to an elastic member and may have a fixing protrusion formed to protrude in the direction toward each wing plate, and each wing plate may have a fixing groove formed opposite to the fixing protrusion at a position at which the screw hole is covered by the protruding piece and a position at which the screw hole is not covered by the protruding piece.

In addition, the coupling pin may further include a fixing end configured to extend from the coupling end and be exposed to an outside of the base plate, a rotation adjusting end formed to be coupled to the fixing end, rotate about the fixing end as an axis while at the same height as the fixing end, and have screw threads formed therein, and a height varying end configured to be coupled to each wing plate, be screw-fastened to the rotation adjusting end, and move upward and downward according to rotation of the rotation adjusting end.

Advantageous Effects

Since a spine fixing angle can be changed using two wing plates, a spine fixing device according to an embodiment of the present disclosure can be flexibly fixed according to the shape of the spine.

Also, since a space formed inside a cage is filled with a synthetic bone material, the spine fixing device according to the present disclosure allows a detailed image to be obtained after surgery.

In addition, using a cover, the spine fixing device according to the present disclosure can prevent detachment of a screw inserted into the spine and thus improve stability of coupling between the spine fixing device and the spine.

MODES OF THE INVENTION

Figure 1A:
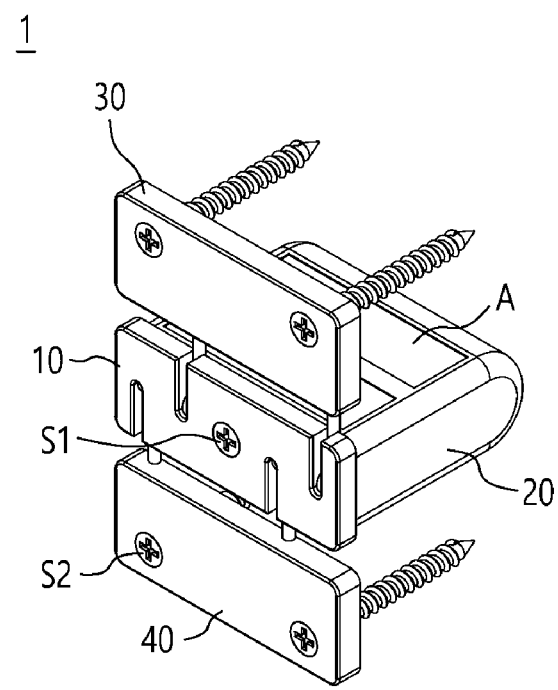
FIGS. 1A and 1B are a perspective view and a rear perspective view of a spine fixing device according to a first embodiment of the present disclosure.

The present disclosure, which will be described below with reference to the accompanying drawings, is not limited to specific embodiments. Various changes may be made to the present disclosure, and the present disclosure may have various embodiments. Also, it should be understood that the content described below includes all changes, equivalents, or substitutes included in the spirit and technical scope of the present disclosure.

In the following description, terms such as first and second are terms used to describe various components and are only used for the purpose of distinguishing one component from another component, without limiting the meanings of the components by themselves.

Throughout the specification, like reference numerals denote like components.

In the present disclosure, a singular expression includes a plural expression unless the context clearly indicates otherwise. Also, terms such as "include" or "have" used below should be construed as indicating the presence of features, numbers, steps, operations, components, parts, or combinations thereof and should not be understood as excluding the possibility of the presence or addition of one or more other features, numbers, steps, operations, components, parts, or combinations thereof in advance.

Figure 1B:
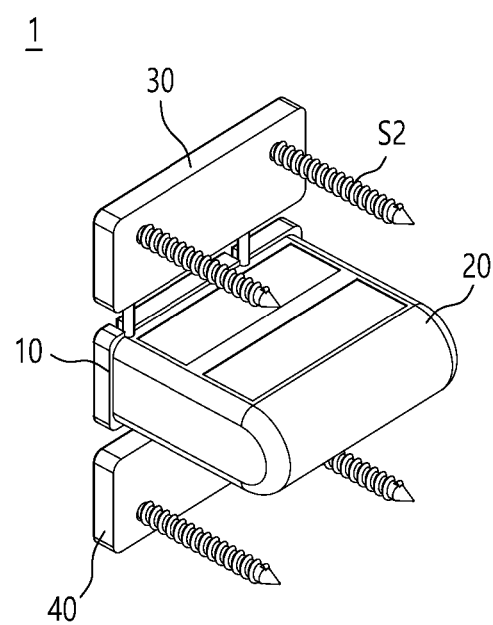
Figure 2:
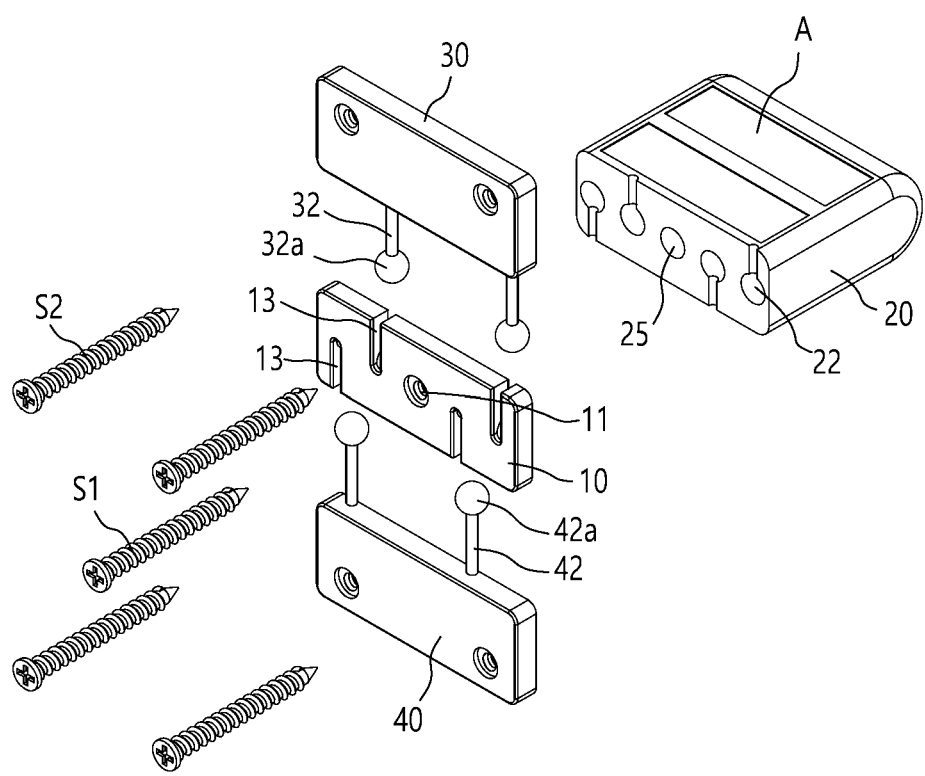
FIG. 2 is an exploded perspective view of the spine fixing device of FIGS. 1A and 1B.
Figure 3:
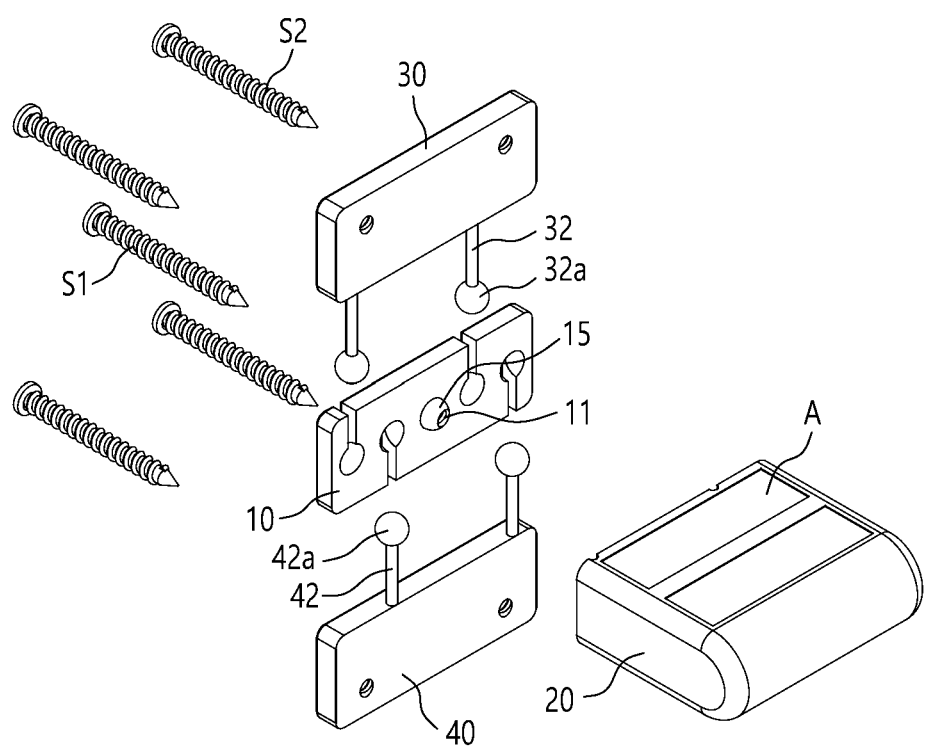
FIG. 3 shows a view of FIG. 2 in the opposite direction.
Figure 4:
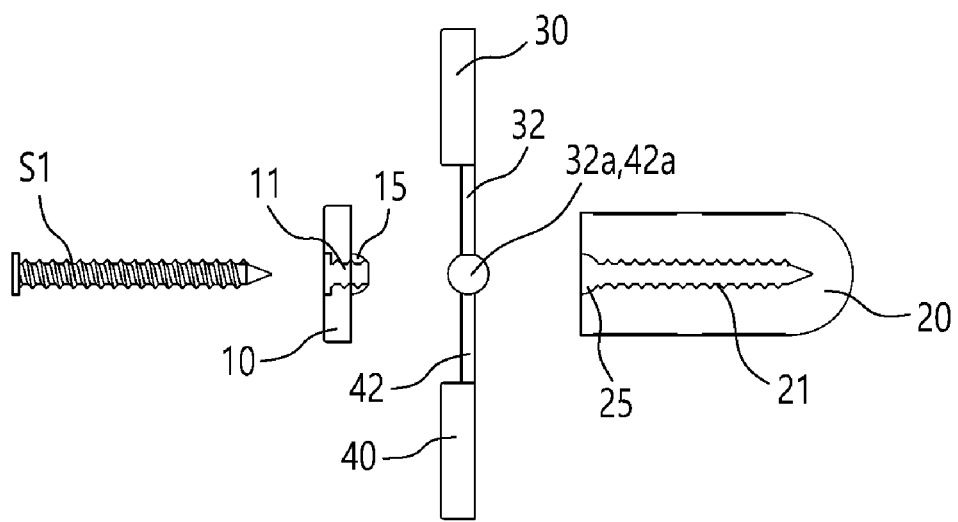
FIG. 4 is a lateral cross-sectional view of the exploded spine fixing device in FIG. 2.
Figure 5:
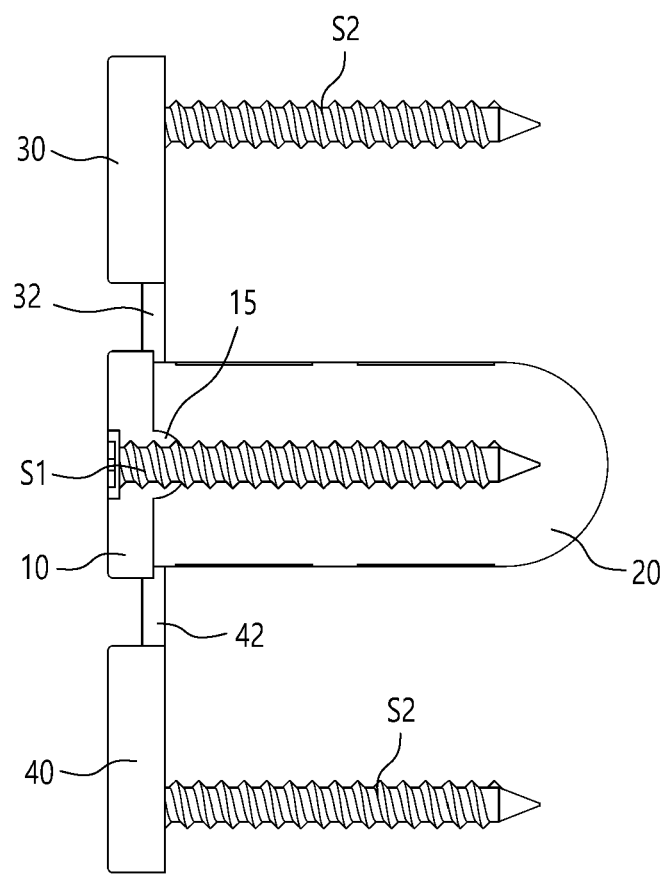
FIG. 5 is a lateral cross-sectional view of a state in which the spine fixing device of FIG. 4 is assembled.

FIGS. 1A and 1B are a perspective view and a rear perspective view of a spine fixing device according to a first embodiment of the present disclosure, FIG. 2 is an exploded perspective view of the spine fixing device of FIGS. 1A and 1B, FIG. 3 shows a view of FIG. 2 in the opposite direction, FIG. 4 is a lateral cross-sectional view of the exploded spine fixing device in FIG. 2, and FIG. 5 is a lateral cross-sectional view of a state in which the spine fixing device of FIG. 4 is assembled.

Figure 6A:
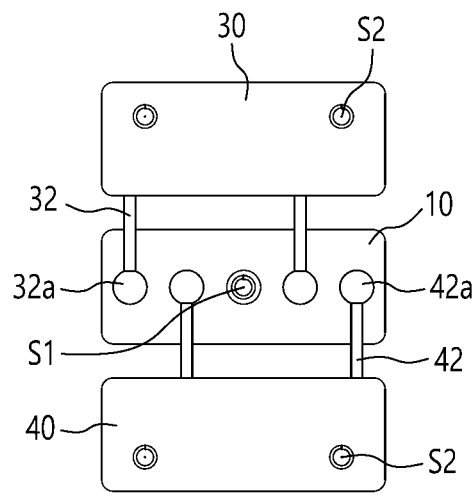
FIGS. 6A and 6B are views showing coupling portions of the first and second wing plates in detail.
Figure 6B:
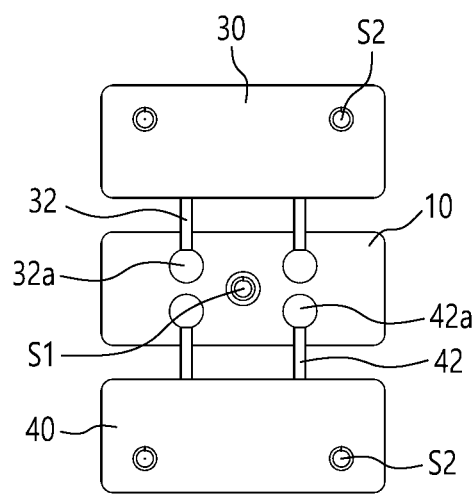
Figure 7:
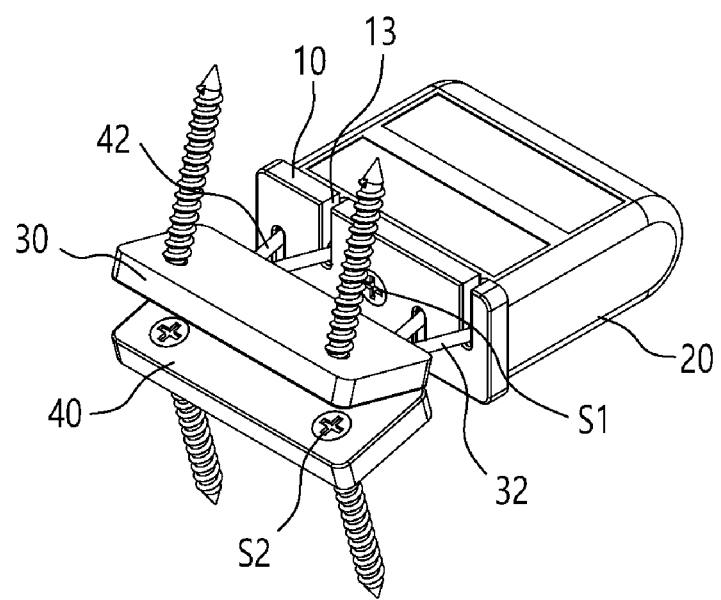
FIG. 7 is a view showing a rotation of the first and second wing plates according to the first embodiment of the present disclosure.

Also, FIGS. 6A and 6B are views showing coupling portions of first and second wing plates in detail, and FIG. 7 is a view showing rotation of the first and second wing plates according to the first embodiment of the present disclosure.

Referring to FIGS. 1A to 7, a spine fixing device 1 according to the first embodiment of the present disclosure may include a base plate 10, a cage 20, a first wing plate 30, and a second wing plate 40.

Specifically, the base plate 10 may be coupled to a front of the cage 20 and, preferably, may be fastened thereto by a fastening member. Here, the fastening member may be a tightening screw S1 which will be described below, but the base plate 10 may be fastened to the cage 20 by providing a fastening member other than the tightening screw S1.

Also, coupling between the base plate 10 and the cage 20 may be performed by a fitting method or a joining method, instead of the fastening method. The fitting method may be implemented by a fitting protrusion formed on one of the base plate 10 and the cage 20 and a fitting groove, into which the fitting protrusion is inserted, provided in the other one of the base plate 10 and the cage 20. Also, the joining method may use various methods such as welding or adhesion through an adhesive.

However, for better understanding, only the case in which the base plate 10 and the cage 20 are coupled using the fastening method and the tightening screw S1 is used as the fastening member as shown in the drawings will be described below.

The base plate 10 may have a screw hole formed therein in order to be fastened to the cage 20. Here, the screw hole is a hole into which the tightening screw S1 is inserted and may be disposed at the center of the base plate 10. Hereinafter, the screw hole formed in the base plate 10 will be referred to as a central screw hole 11.

The cage 20 may be coupled to a rear of the base plate 10. Here, the cage 20 is a plate body placed between vertebral bodies in a case in which the spine fixing device 1 is inserted into the spine. Here, as illustrated in FIG. 2, the cage 20 may be formed as one body, and the central screw hole 11, into which the tightening screw S1 will be inserted, may be formed to extend in the cage 20.

For distinction, the central screw hole formed in the base plate will be referred to as a first central screw hole 11, and the central screw hole formed to extend in the cage 20 will be referred to as a second central screw hole 21 in the following description.

The tightening screw S1 inserted into the first central screw hole 11 and the second central screw hole 21 has a synthetic bone material insertion path (not illustrated) provided therein to allow a synthetic bone material A to be injected and has a synthetic bone material discharge path (not illustrated) formed to extend from the synthetic bone material insertion path toward an outer peripheral surface or end of the tightening screw S1 to allow the synthetic bone material A to be discharged.

Here, since the cage 20 is formed as one body whose front surface, left and right side surfaces, and upper and lower surfaces are all closed, an outflow of the synthetic bone material A discharged through the tightening screw S1 may be prevented, and the synthetic bone material A may be placed in the first central screw hole 11 or the second central screw hole 21.

In the case in which the synthetic bone material A is stored in the cage 20 as described above, a high-quality image may be obtained when an image of the spine fixing device 1 fixed to the spine is captured, and an accurate position of the spine fixing device 1 may be identified based on the high-quality image.

The cage 20 may be formed of various biocompatible materials such as polyether ether ketone (PEEK), titanium, a synthetic bone material, and a plastic resin.

Here, PEEK is a high-performance thermoplastic resin having various characteristics such as high strength, high stiffness, high-temperature resistance, and chemical resistance and is a biomaterial used in magnetic resonance imaging (MRI) and medical implants, and the synthetic bone material is a material identical to that used for an artificial bone made of calcium (Ca) and phosphorus (P).

Meanwhile, a semispherical coupler 15 may protrude from one of the base plate 10 and the cage 20, and a semispherical insertion groove 25, into which the coupler 15 is inserted, may be formed in the other one of the base plate 10 and the cage 20. While the base plate 10 and the cage 20 are coupled, the semispherical coupler 15 may be configured to be inserted into the insertion groove 25 to fix the positions of the base plate 10 and the cage 20 and further facilitate coupling therebetween.

In this case, the tightening screw S1 may be configured to pass through the coupler 15 and couple the base plate 10 and the cage 20.

The first wing plate 30 and the second wing plate 40 may be coupled to an upper portion and a lower portion, respectively, of a composite body of the base plate 10 and the cage 20. Here, preferably, the first wing plate 30 and the second wing plate 40 may be coupled to a coupling portion between the base plate 10 and the cage 20, that is, coupled between the base plate 10 and the cage 20.

This is to, when the tightening screw S1, which will be described below, is inserted into the cage 20, bring the base plate 10 and the cage 20 in close contact and fix the first wing plate 30 and the second wing plate 40.

To this end, a space in which a coupling portion between the first wing plate 30 and the second wing plate 40 will be placed may be provided at each of a rear end of the base plate 10 and a front end of the cage 20. Since the coupling portions between the first wing plate 30 and the second wing plate 40 may be spherical coupling ends 32a and 42a as will be described below, semispherical coupling grooves 12 and 22, into which a half of the spherical coupling end will be inserted, may be formed in the rear end of the base plate 10 and the front end of the cage 20.

However, the positions at which the first and second wing plates 30 and 40 are coupled to the composite body of the base plate 10 and the cage 20 are not necessarily limited, and the coupling positions may be changed. For example, the first and second wing plates 30 and 40 may be coupled to the inside of the base plate 10.

Meanwhile, the form in which the first wing plate 30 and the second wing plate 40 are coupled is not limited, but, preferably, each of the first wing plate 30 and the second wing plate 40 may be coupled to be perpendicular to the composite body of the base plate 10 and the cage 20.

Also, further, each of the first wing plate 30 and the second wing plate 40 may be configured to rotate forward from the coupling position where each of the first wing plate 30 and the second wing plate 40 is perpendicular to the composite body of the base plate 10 and the cage 20, and to this end, a guide groove 13 configured to guide rotation of the first wing plate 30 and the second wing plate 40 may also be provided in each of an upper portion and a lower portion of the base plate 10.

A structure for the rotation of the first wing plate 30 and the second wing plate 40 will be described in more detail below.

Meanwhile, the first and second wing plates 30 and 40 may include one or more coupling pins 32 and 42 and be coupled to the composite body of the base plate 10 and the cage 20. Here, the coupling pins 32 and 42 may form lengths so that each of the wing plates 30 and 40 is spaced apart from the base plate 10.

That is, the coupling pins 32 and 42 may be formed to be exposed to the upper portion or lower portion of the composite body of the base plate 10 and the cage 20 while coupled to the composite body of the base plate 10 and the cage 20, and the first and second wing plates 30 and 40 may be formed at ends of the coupling pins 32 and 42 exposed to the outside of the composite body of the base plate 10 and the cage 20.

Also, the coupling pins 32 and 42 may be configured to include the spherical coupling ends 32a and 42a and be coupled to the base plate 10. Preferably, the spherical coupling ends 32a and 42a may be formed at tips of the coupling pins 32 and 42 and may be formed to have a diameter greater than widths of the coupling pins 32 and 42.

The coupling pins 32 and 42 allow the wing plates 30 and 40 to rotate about the spherical coupling ends 32a and 42a as axes, and in a case in which the coupling pins 32 and 42 are provided as a single coupling pin, the single coupling pin may have flexibility to allow the wing plates 30 and 40 to freely rotate along circumferences of the coupling ends 32a and 42a to also correspond to a bone whose curvature is not constant.

In a case in which the coupling ends 32a and 42a are positioned between the base plate 10 and the cage 20, the coupling ends 32a and 42a may be fixed by tightening of the tightening screw S1 configured to pass through the base plate 10, be inserted into the cage 20, and couple the base plate 10 and the cage 20.

That is, in the case in which the tightening screw S1 is tightened, the base plate 10 and the cage 20 are pulled in directions coming in close contact with each other, and in this way, the coupling ends 32a and 42a positioned between the base plate 10 and the cage 20 are brought into close contact, and the first and second wing plates 30 and 40 may be fixed to the composite body of the base plate 10 and the cage 20.

Here, a fixing strength of the coupling ends 32a and 42a may be adjusted by a degree to which the tightening screw S1 is tightened, and in this way, the rotation of the first wing plate 30 and the second wing plate 40 may be adjusted. For example, in a case in which the tightening screw S1 is strongly tightened, the first wing plate 30 and the second wing plate 40 may be fixed at an angle of rotation, and conversely, in a case in which the tightening screw S1 is weakly tightened, the first wing plate 30 and the second wing plate 40 may not be fixed and may be rotatable.

The coupling ends 32a and 42a may form a row as the central screw holes 11 and 21 and the coupling grooves 12 and 22 are arranged in a row as illustrated in FIG. 6A or may form an X-shape as the central screw holes 11 and 21 and the coupling grooves 12 and 22 are arranged in an X-shape as illustrated in FIG. 6B.

Meanwhile, the first wing plate 30 and the second wing plate 40 coupled to the composite body of the base plate 10 and the cage 20 as described above may include one or more screw holes (not denoted by reference numerals) to allow insertion of a screw S2 which will be fixed to the spine, and the screw S2 may pass through the screw holes and be fixed to the spine.

The first and second wing plates 30 and 40 may have different shapes but, preferably, may have the same shape. That is, the first and second wing plates 30 and 40 may have the same forms except for the positions at which the first and second wing plates 30 and 40 are coupled to the base plate 10 and directions of rotation of the first and second wing plates 30 and 40 at the coupling positions.

Here, in a case in which the coupling grooves 12 and 22 and the central screw holes 11 and 21 are arranged in a row in the horizontal direction, the coupling pins 32 and 42 of the first wing plate 30 and the second wing plate 40 may be, due to being formed in the same shape, provided at positions biased toward one side from the center in order to avoid interference. That is, as shown in the drawings, the coupling pins 32 and 42 of the first wing plate 30 and the second wing plate 40 may form alternating structures when coupled to the base plate 10.

In the case in which the first and second wing plates 30 and 40 are formed in the same shape, the process may be standardized, and the time, cost, and the like for the process may be reduced.

Further, the first and second wing plates 30 and 40 may be formed of a biocompatible material and minimize adverse reaction in the body. For example, the first and second wing plates 30 and 40 may be formed of titanium and secure biocompatibility and high durability. However, this is only a preferred example, and the present disclosure is not limited thereto. The material of the first and second wing plates 30 and 40 may be substituted with other materials with high biocompatibility and durability.

The first and second wing plates 30 and 40 may be coupled to the composite body of the base plate 10 and the cage 20 only in a vertical state but may also be configured to be rotatable at the coupling positions as illustrated in FIG. 7.

In the case in which the first and second wing plates 30 and 40 are formed to be rotatable, the degree to which the tightening screw S1 is tightened may be adjusted as described above, and the first wing plate 30 and the second wing plate 40 may be rotated to correspond to the shape of the spine and then fixed at an angle of rotation.

Meanwhile, the spine fixing device 1 according to an embodiment of the present disclosure may further include a cover 50. This will be described with reference to FIGS. 8A to 10.

Figure 8A:
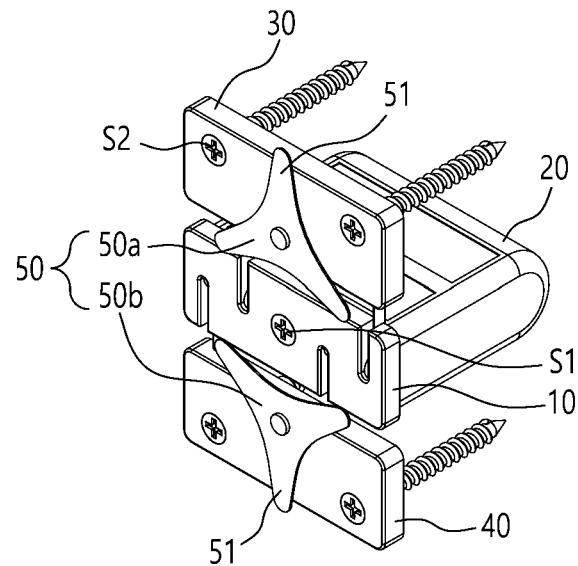
FIG. 8A is a view showing the spine fixing device including a cover according to the first embodiment of the present disclosure.
Figure 8B:
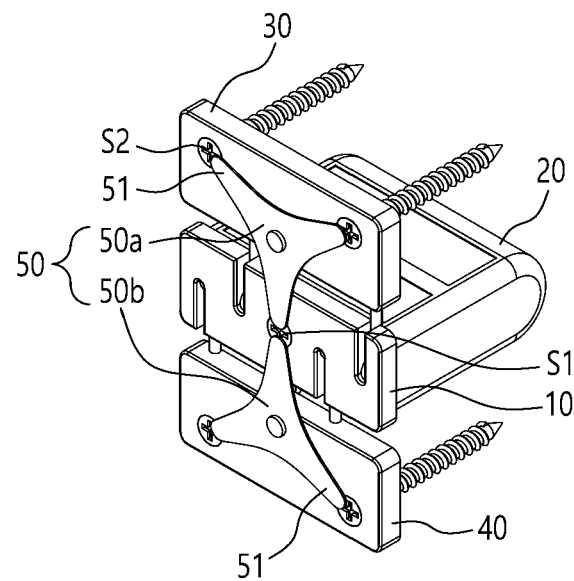
FIG. 8B is a view showing a state in which the cover is rotated.

FIG. 8A is a view showing the spine fixing device including a cover according to the first embodiment of the present disclosure, and FIG. 8B is a view showing a state in which the cover is rotated.

Referring to FIGS. 8A and 8B, the cover 50 may be coupled to each of the first and second wing plates 30 and 40. Also, the cover 50 may be coupled at a position opposite to the cage 20 with respect to the base plate 10.

That is, since the cage 20 is coupled to the rear of the base plate 10, the cover 50 may be coupled to each of the first and second wing plates 30 and 40 at the front opposite to the cage 20.

Also, the cover 50 may be disposed to be rotatable with respect to a shaft coupled to each of the wing plates 30 and 40. Here, the cover 50 may selectively cover the central screw hole 11 and another screw hole according to an angle of rotation.

That is, the cover 50 may be disposed to prevent detachment of the screw S2 passing through the first wing plate 30 or the second wing plate 40 and inserted into the spine. Here, the screw S2 may be inserted into the first wing plate 30 and the second wing plate 40 and the spine fixing device 1 may be fixed to the spine in a state in which the cover 50 is open, and then, the cover 50 may be rotated to cover the screw hole to prevent detachment of the screw S2.

More specifically, the cover 50 may include a first cover 50a configured to be coupled to the first wing plate 30 and a second cover 50b configured to be coupled to the second wing plate 40.

Here, the first cover 50a may cover upper sides of screw holes formed in the first wing plate 30 and the central screw hole 11 and may rotate clockwise or counterclockwise. Also, the first cover 50a may have a plurality of protruding pieces 51 formed to cover the upper sides of the screw holes formed in the first wing plate 30 and the central screw hole 11. Here, the number of protruding pieces 51 may correspond to the number of screw holes formed in the first wing plate 30, including the central screw hole 11.

The second cover 50b may cover lower sides of screw holes formed in the second wing plate 40 and the central screw hole 11 and may rotate clockwise or counterclockwise. Also, the second cover 50b may have a plurality of protruding pieces 51 formed to cover the lower sides of the screw holes formed in the second wing plate 40 and the central screw hole 11. Here, the number of protruding pieces 51 may correspond to the number of screw holes formed in the second wing plate 40, including the central screw hole 11.

In the above configurations, first, in a state in which the screw holes and the central screw hole 11 are not covered by the covers 50a and 50b, angles of the first and second wing plates 30 and 40 relative to the base plate 10 may be adjusted, and the tightening screw S1 may be inserted into the central screw hole 11 to fix the angles of the first and second wing plates 30 and 40.

Then, the screw S2 may be inserted into each screw hole to fix the spine fixing device 1 to the spine, and after the screw S2 is inserted into each screw hole, the first cover 50a and the second cover 50b may be rotated to simultaneously cover the central screw hole 11 and each screw hole. In this way, the tightening screw S1 inserted into the central screw hole 11 and the screw S2 inserted into each screw hole may be prevented from falling out.

In this process, the first cover 50a and the second cover 50b may, in a double manner, cover each of an upper end and a lower end of the central screw hole 11 of the base plate 10 to ensure that the first and second wing plates 30 and 40 are prevented from rotating.

Figure 9A:
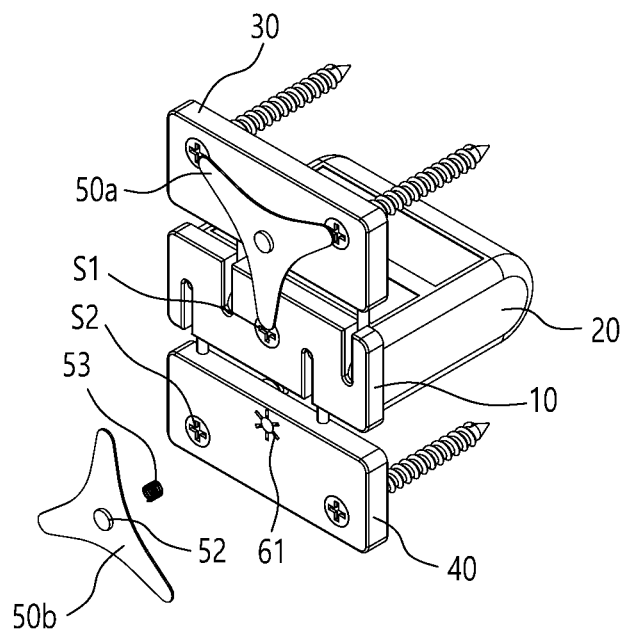
FIG. 9A is an exploded perspective view of the cover of the spine fixing device that includes an elastic member, a fixing protrusion, and a fixing groove according to the first embodiment of the present disclosure.
Figure 9B:
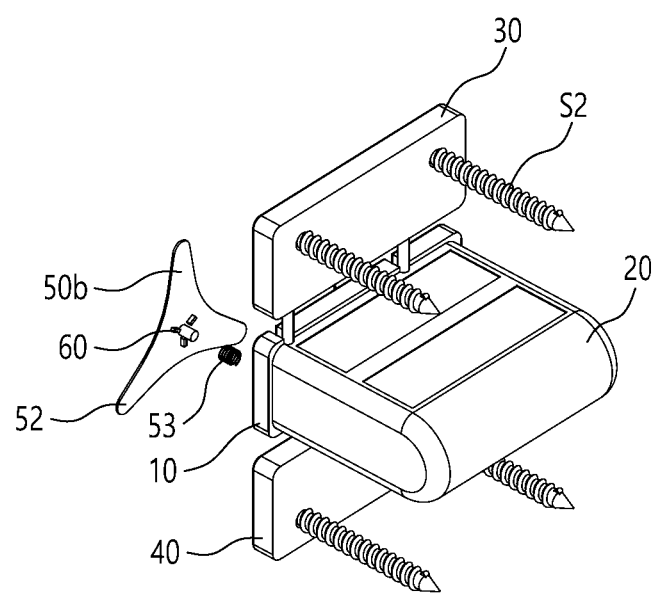
FIG. 9B is a rear perspective view of FIG. 9A.
Figure 10:
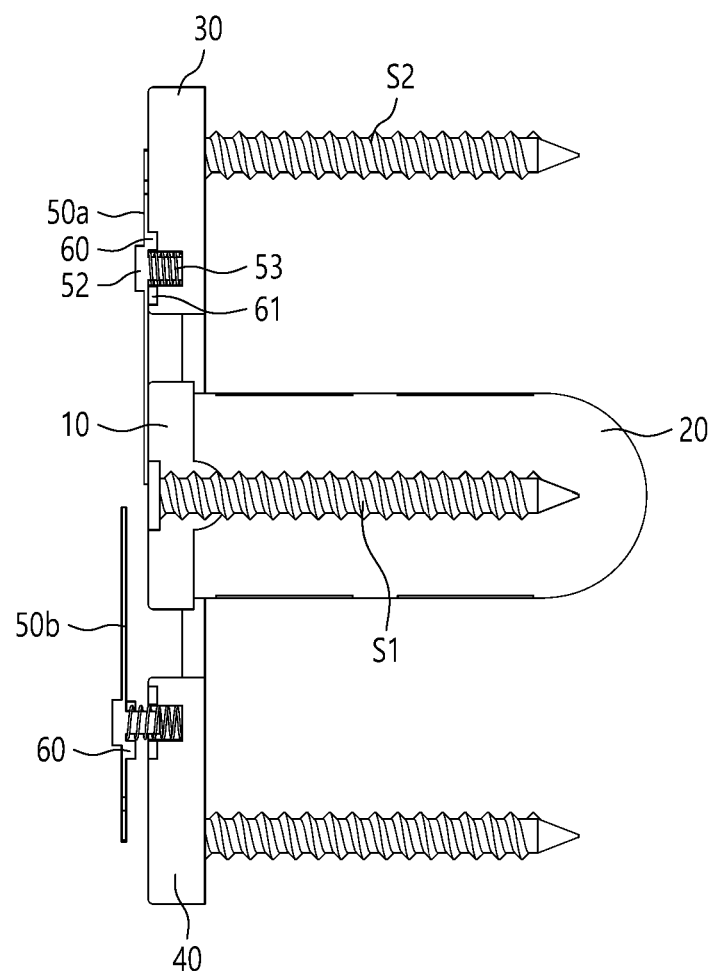
FIG. 10 is a cross-sectional view showing a comparison between a first cover in a state in which the spine fixing device of FIGS. 9A and 9B is not compressed and a second cover in a state in which the spine fixing device is compressed.

FIG. 9A is an exploded perspective view of the cover of the spine fixing device that includes an elastic member, a fixing protrusion, and a fixing groove according to the first embodiment of the present disclosure, FIG. 9B is a rear perspective view of FIG. 9A, and FIG. 10 is a cross-sectional view showing a comparison between a first cover in a state in which the spine fixing device of FIGS. 9A and 9B is not compressed and a second cover in a state in which the spine fixing device is compressed.

Referring to FIGS. 9A, 9B, and 10, each of the covers 50a and 50b may include an elastic member 53. Here, the elastic member 53 may be provided at an end of a rotating shaft 52 of the cover 50.

Here, the elastic member 53 may be formed to have a pressing force to press the cover 50 toward each of the wing plates 30 and 40. That is, due to the pressing force of the elastic member 53, the cover 50 may be formed to come in close contact with the wing plates 30 and 40.

Also, the cover 50 may have one or more fixing protrusions 60 formed to protrude toward the wing plates 30 and 40.

Also, each of the wing plates 30 and 40 may have a fixing groove 61 formed opposite to the fixing protrusion 60 at a position at which the protruding piece 51 covers a screw hole and a position at which the protruding piece 51 does not cover a screw hole. That is, the fixing groove 61 may be formed in at least one position where the protruding piece 51 covers a screw hole and at least one position where the protruding piece 51 does not cover a screw hole.

When the cover 50 is pulled so that the elastic member 53 is stretched at the position where the protruding piece 51 does not cover a screw hole, and then the cover 50 is rotated to the position where the protruding piece 51 covers a screw hole, and the cover 50 is pushed in a pressing direction of the elastic member 53, the protruding piece 51 strongly presses the central screw hole 11 and the screw hole and more strongly prevents detachment of the tightening screw S1 and the screw S2, and unintentional rotation of the cover 50 may be prevented by a fixing force of the fixing protrusion 60 to the fixing groove 61.

Further, the coupling pins 32 and 42 described above may be formed to be height-adjustable. This will be described with reference to FIGS. 11 and 12.

Figure 11:
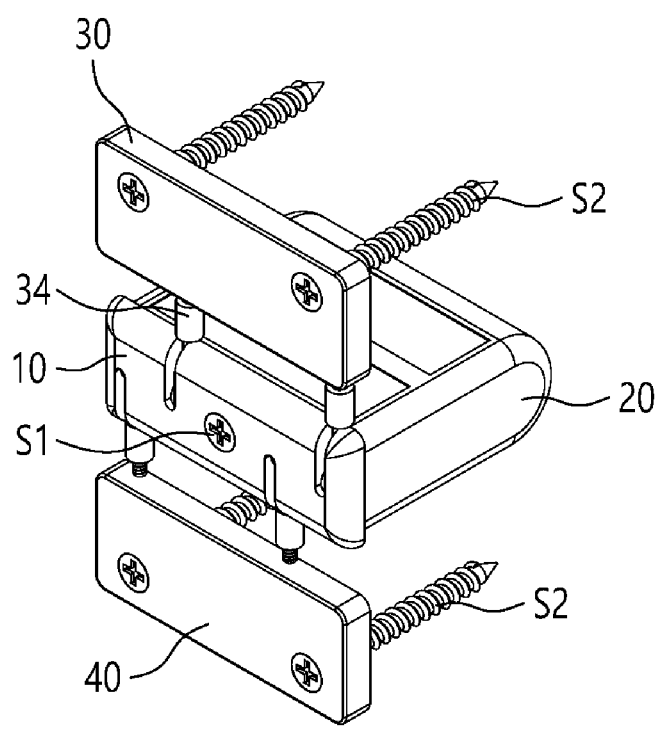
FIG. 11 is a perspective view showing an example in which the spine fixing device according to the first embodiment of the present disclosure includes a height-adjustable coupling pin.
Figure 12:
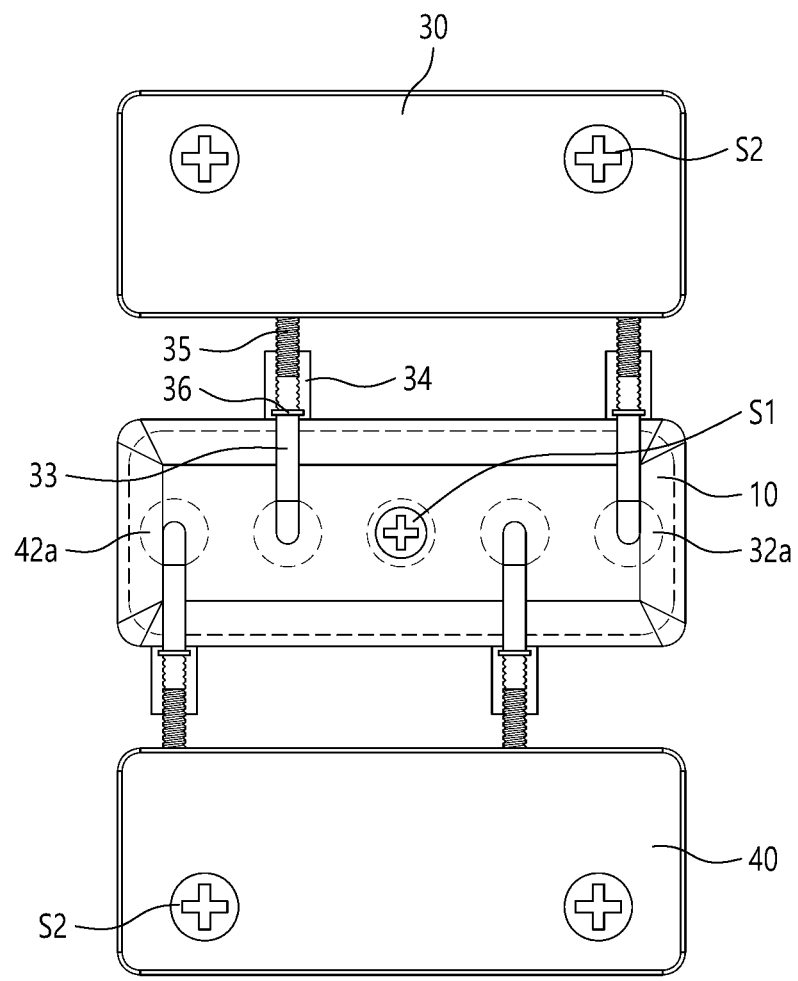
FIG. 12 is a cross-sectional view showing the coupling pin of FIG. 11 in detail.

FIG. 11 is a perspective view showing an example in which the spine fixing device according to the first embodiment of the present disclosure includes a height-adjustable coupling pin, and FIG. 12 is a cross-sectional view showing the coupling pin of FIG. 11 in detail.

Referring to FIGS. 11 and 12, for the coupling pins 32 and 42 to be height-adjustable, the coupling pins 32 and 42 may further include a fixing end 33, a rotation adjusting end 34, and a height varying end 35, in addition to the above-described coupling ends 32a and 42a.

Specifically, the fixing end 33 may be configured to extend from the coupling ends 32a and 42a and be exposed to the outside of the base plate 10. Also, the rotation adjusting end 34 may be configured to be coupled to the fixing end 33 and rotate about the fixing end 33 as an axis. Here, a supporting end 36 configured to support a lower end of the rotation adjusting end 34 may be formed at the lower end of the rotation adjusting end 34 so that the rotation adjusting end 34 can rotate only at the same height as the fixing end 33.

Also, a roller or ball (not illustrated) configured to reduce friction may be provided between the supporting end 36 and the rotation adjusting end 34.

Also, the height varying end 35 may be configured to be coupled to each of the wing plates 30 and 40 and may be screw-fastened to the rotation adjusting end 34. Accordingly, when the rotation adjusting end 34 is rotated, the height varying end 35 may be configured to move upward and downward according to the direction of rotation and may adjust a separation distance between the wing plates 30 and 40 and the base plate 10.

Figure 13:
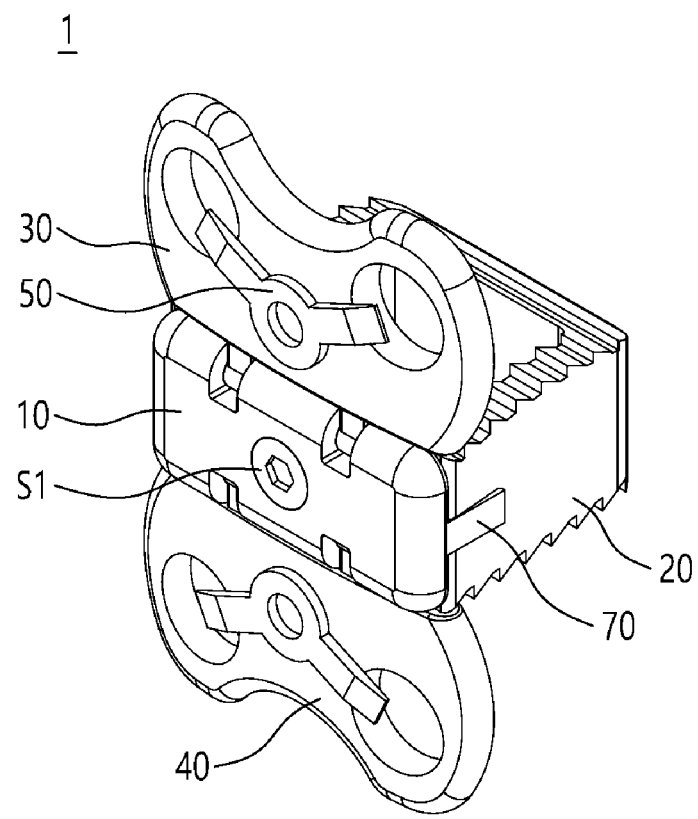
FIG. 13 is a perspective view of a spine fixing device according to a second embodiment of the present disclosure.
Figure 14:
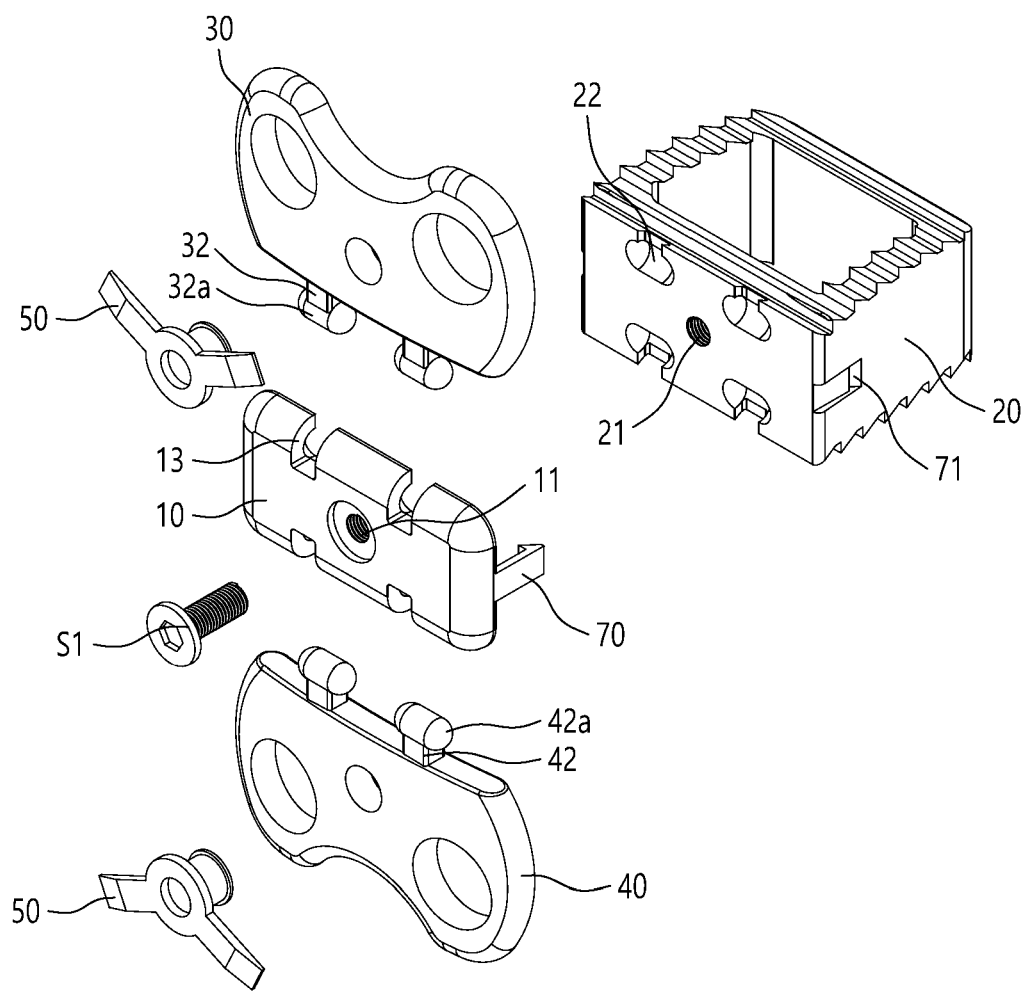
FIG. 14 is an exploded perspective view of the spine fixing device of FIG. 13.
Figure 15:
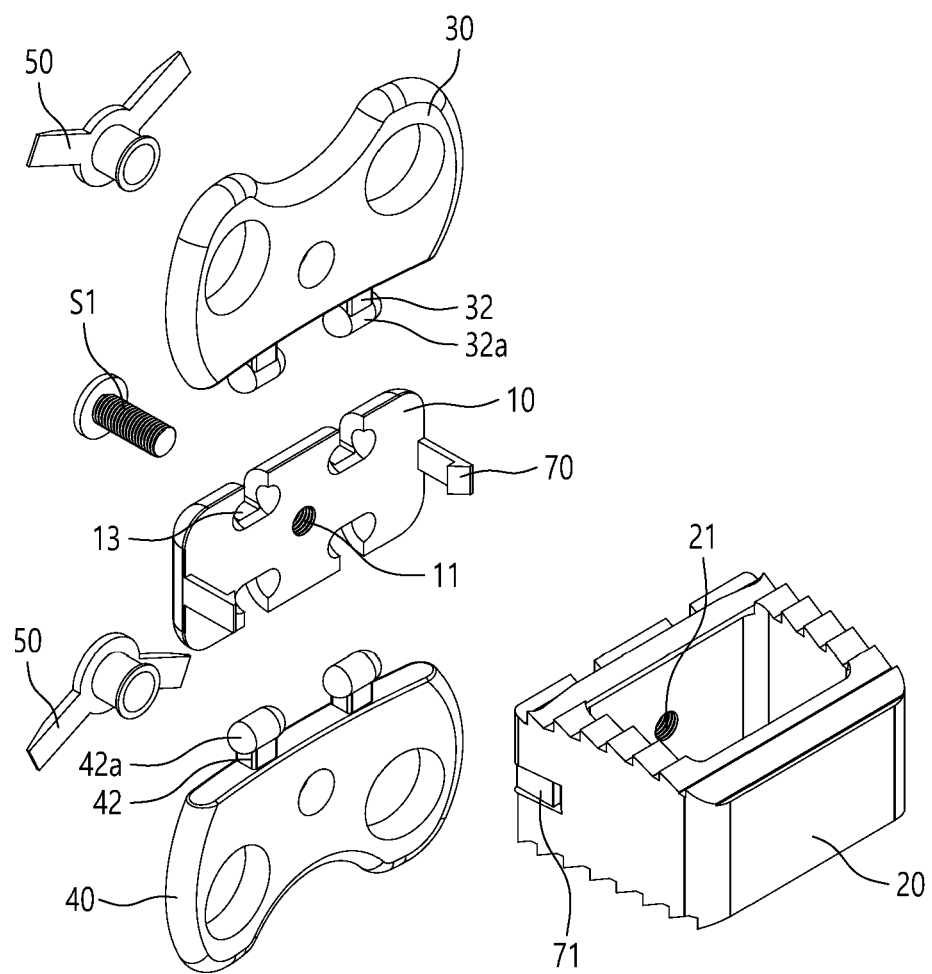
FIG. 15 shows a view of FIG. 14 in the opposite direction.
Figure 16:
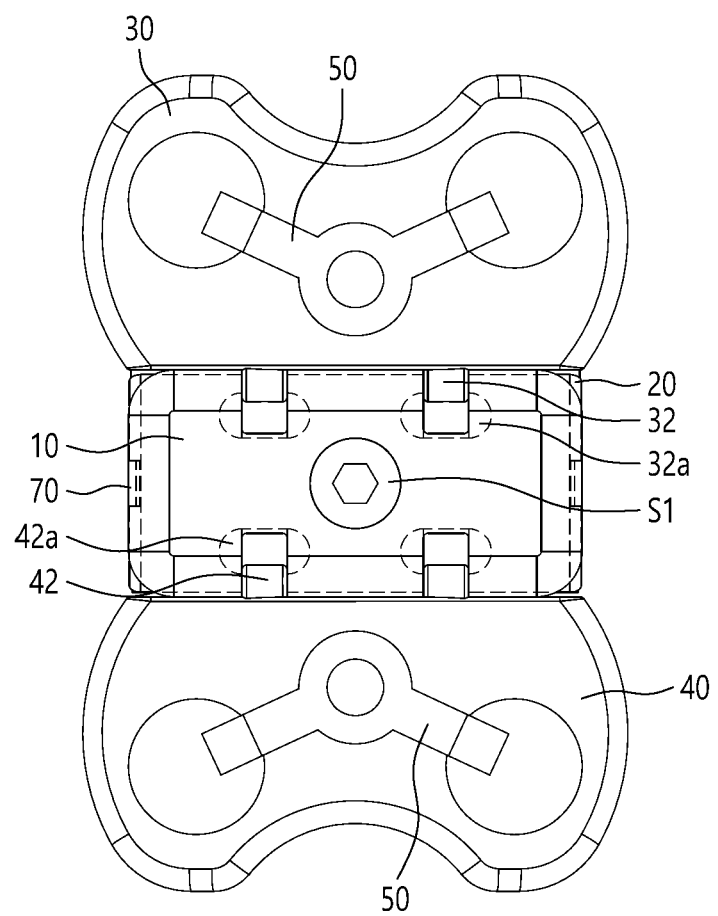
FIG. 16 shows a projection of a coupling portion between a base plate and each wing plate in the spine fixing device of FIG. 13 that is viewed from the front.

FIG. 13 is a perspective view of a spine fixing device according to a second embodiment of the present disclosure, FIG. 14 is an exploded perspective view of the spine fixing device of FIG. 13, FIG. 15 shows a view of FIG. 14 in the opposite direction, and FIG. 16 shows a projection of a coupling portion between a base plate and each wing plate in the spine fixing device of FIG. 13 that is viewed from the front.

Referring to FIGS. 13 to 16, configurations and operations of the spine fixing device according to the second embodiment of the present disclosure are substantially the same as those of the spine fixing device according to the first embodiment of the present disclosure, but the coupling ends 32a and 42a of the coupling pins 32 and 42 may have a capsular shape, and the cover 50 may only cover the screw holes (not denoted by reference numerals) formed in the first and second wing plates 30 and 40.

That is, the coupling ends 32a and 42a are not necessarily limited to having a spherical shape and may also be formed in a capsular shape as illustrated in FIGS. 13 to 16. In the case in which the coupling ends 32a and 42a are formed in a capsular shape, there are advantages that the coupling ends 32a and 42a are less likely to be detached from the base plate 10 or the cage 20, and an area in contact with the base plate 10 and the cage 20 is larger compared to the spherical shape, thus making angle maintenance relatively easy.

Meanwhile, in the case in which the capsular coupling ends are formed, the coupling grooves 12 and 22 provided at the rear end of the base plate 10 and the front end of the cage 20 may also be provided to have a semi-capsular shape to correspond to the capsular coupling ends.

Also, the coupler 15 and the insertion groove 25 may not be provided between the base plate 10 and the cage 20, and instead, a fastening pin 70 and a fastening groove 71 to which the fastening pin 70 is fastened may be provided between the base plate 10 and the cage 20.

The fastening pin 70 may protrude from one of the base plate 10 and the cage 20, and the fastening groove 71 may be provided in the other one of the base plate 10 and the cage 20 where the fastening pin 70 is not provided, and the fastening pin 70 may be inserted into the fastening groove 71. In this way, the fastening pin 70 and the fastening groove 71 may form a fixing force between the base plate 10 and the cage 20, together with the tightening screw S1.

Other undescribed configurations are substantially the same as in the spine fixing device according to the first embodiment, and thus detailed description thereof will be omitted.

Embodiments of the present disclosure have been described above with reference to the accompanying drawings, but those of ordinary skill in the art to which the present disclosure pertains should understand that the present disclosure may be carried out in other specific forms without changing the technical spirit or essential features of the present disclosure. Therefore, the embodiments described above are illustrative, instead of limiting, in all aspects.

DESCRIPTION OF REFERENCE NUMERALS

1: spine fixing device
10: base plate
11: central screw hole
12: coupling groove
13: guide groove
15: coupler
20: cage
21: central screw hole
22: coupling groove
25: insertion groove
30: first wing plate
32: coupling pin
32a: coupling end
33: fixing end
34: rotation adjusting end
35: height varying end
36: supporting end
40: second wing plate
42: coupling pin
42a: coupling end
50: cover
50a: first cover
50b: second cover
51: protruding piece
52: rotating shaft
53: elastic member
60: fixing protrusion
61: fixing groove
70: fastening pin
71: fastening groove
S1: tightening screw
S2: screw
A: synthetic bone material

The invention claimed is:

1. A spine fixing device comprising:
a composite body having:
 a base plate; and
 a cage configured to be coupled to the base plate;
a first wing plate configured to be coupled to a first portion of the composite body;
a second wing plate configured to be coupled to a second portion of the composite body; and
a cover including a first cover and a second cover, respectively coupled to each of the first and second wing plates at a position opposite to the cage with respect to the base plate,
the first cover having a plurality of first protruding pieces corresponding to a plurality of first screw holes defined on the first wing plate and a central screw hole defined on a center of the base plate, and the second cover having a plurality of second protruding pieces corresponding to a plurality of second screw holes defined on the second wing plate and the central screw hole,
wherein the first cover is configured to rotate about a first shaft coupled to the first wing plate and position the plurality of first protruding pieces to simultaneously cover the plurality of first screw holes and at least a part of the central screw hole, and the second cover is configured to rotate about a second shaft coupled to the second wing plate and position the plurality of second protruding pieces to simultaneously cover the plurality of second screw holes and at least a part of the central screw hole.

2. The spine fixing device of claim 1, wherein both the first and second wing plates are coupled to the composite body and are configured to rotate along a guide groove that is defined in the base plate.

3. The spine fixing device of claim 1, wherein each of the first and second wing plates has a coupling pin including a spherical or a capsular coupling end, which is configured to be coupled to the base plate.

4. The spine fixing device of claim 3, wherein the coupling pin has a predetermined length allowing each of the first and second wing plates to be spaced apart from the composite body in a height direction thereof.

5. The spine fixing device of claim 3, wherein
the coupling end of each of the first and second wing plates is interposed between the base plate and the cage, wherein each of the base plate and the cage comes in close contact with the coupling end of each of the first and second wing plates, ensuring a secure coupling therebetween, and
the base plate and the cage are coupled by a tightening screw passing through the base plate and being inserted into the cage.

6. The spine fixing device of claim 5, wherein a fixing strength of the coupling end of each of the first and second wing plates is adjusted based on a degree of tightness when the tightening screw is fastened.

7. The spine fixing device of claim 5, wherein
a coupler protrudes from one of the base plate and the cage, and an insertion groove, into which the coupler is inserted, is defined in another one of the base plate and the cage, and while the base plate and the cage are coupled, the coupler is configured to be accommodated into the insertion groove, and
the tightening screw is configured to pass through the coupler.

8. The spine fixing device of claim 5, wherein the tightening screw has a synthetic bone material insertion path configured to accommodate a synthetic bone material therein and a synthetic bone material discharge path extending from the synthetic bone material insertion path toward an outer peripheral surface of the tightening screw configured to discharge the synthetic bone material.

9. The spine fixing device of claim 3, wherein the coupling pin further includes:
a fixing end configured to extend from the coupling end and be exposed to an outside of the base plate;
a rotation adjusting end coupled to the fixing end, configured to rotate about the fixing end along an axis at a same height as the fixing end, and having screw threads defined therein; and
a height-varying end configured to be coupled to each of the first and second wing plates, be screw-fastened to the rotation adjusting end, and move upward and downward according to a rotation of the rotation adjusting end.
10. The spine fixing device of claim 1, wherein
an elastic body is interposed between the cover and the each of the first and second wing plates, providing a pressing force to the cover in a direction toward the each of the first and second wing plates,
the cover has a fixing protrusion protruding in the direction toward each of the first and second wing plates, and
each of the first and second wing plates has a fixing groove defined to accommodate the fixing protrusion at a position at which the screw hole is covered by protruding pieces and a position at which the screw hole is not covered by the protruding pieces.

* * * * *